United States Patent
Jaynes (10) Patent No.: US 12,472,787 B2
(45) Date of Patent: Nov. 18, 2025

(54) LOAD EQUALIZER ASSEMBLY FOR TANDEM STEER SUSPENSION

(71) Applicant: Fontaine Modification Company, Charlotte, NC (US)

(72) Inventor: Dan Jaynes, Mt. Holly, NC (US)

(73) Assignee: Fontaine Modification Company, Charlotte, NC (US)

( * ) Notice: Subject to any disclaimer, the term of this patent is extended or adjusted under 35 U.S.C. 154(b) by 0 days.

(21) Appl. No.: 18/623,249

(22) Filed: Apr. 1, 2024

(65) Prior Publication Data

US 2024/0326534 A1 Oct. 3, 2024

Related U.S. Application Data

(60) Provisional application No. 63/493,870, filed on Apr. 3, 2023.

(51) Int. Cl.
*B60G 5/053* (2006.01)
*B60G 5/06* (2006.01)

(52) U.S. Cl.
CPC ............... *B60G 5/053* (2013.01); *B60G 5/06* (2013.01); *B60G 2202/112* (2013.01)

(58) Field of Classification Search
CPC .... B60G 5/053; B60G 5/06; B60G 2202/112; B60G 2202/31; B60G 2300/0262; B60G 5/00; B60G 11/12; B60G 2204/121; B60G 2204/43; B60G 2204/8302; B60G 2206/601; B60G 2204/80
See application file for complete search history.

(56) References Cited

U.S. PATENT DOCUMENTS

| | | | |
|---|---|---|---|
| 1,892,668 | A | 1/1933 | Heiney |
| 2,653,035 | A | 9/1953 | Ward |
| 2,880,991 | A | 4/1959 | Ward |
| 3,290,052 | A | 12/1966 | Stanley |
| 4,344,642 | A | 8/1982 | Goth |

(Continued)

FOREIGN PATENT DOCUMENTS

| | | |
|---|---|---|
| CA | 2070859 C | 1/1995 |
| CA | 2370429 A1 | 9/2002 |

(Continued)

OTHER PUBLICATIONS etrailer.com, "Dexter Tandem-Axle Trailer Hanger Kit for 3" Slipper Springs—38" Axle Spacing", webpage, https://www.etrailer.com/Trailer-Leaf-Spring-Suspension/Redline/HAP-103-203-01.html, accessed Aug. 12, 2020, 8 pages.

(Continued)

*Primary Examiner* — Karen Beck
(74) *Attorney, Agent, or Firm* — Andrus Intellectual Property Law, LLP (57) ABSTRACT

A load equalizer assembly for a vehicle comprises a mounting bracket configured to be fixedly mounted to the vehicle, the mounting bracket having a downwardly extending arm. An equalizer bracket is pivotally connected to the mounting bracket by way of the arm. The equalizer bracket comprises a laterally facing side having a stepped surface with an inwardly stepped portion and an outwardly stepped portion. The arm is received laterally adjacent to the inwardly stepped portion of the equalizer bracket.

18 Claims, 8 Drawing Sheets

(56) References Cited

U.S. PATENT DOCUMENTS

| | | | |
|---|---|---|---|
| 4,502,707 A | 3/1985 | Jable | |
| 4,505,459 A | 3/1985 | Goth | |
| 4,763,921 A | 8/1988 | Steiner | |
| 5,234,067 A | 8/1993 | Simard | |
| 5,366,035 A | 11/1994 | Hayashida | |
| 6,382,659 B1 | 5/2002 | Simard | |
| 6,604,756 B2 | 8/2003 | Simard | |
| 7,195,272 B2 | 3/2007 | Larson | |
| 7,296,821 B2 | 11/2007 | Fenton | |
| 7,384,052 B2 | 6/2008 | Gideon | |
| 7,495,185 B2 | 2/2009 | Takeda | |
| 7,850,195 B2 | 12/2010 | Simard | |
| 7,866,682 B2 | 1/2011 | Simard | |
| 8,141,896 B2 | 3/2012 | Simard | |
| 9,261,227 B2 | 2/2016 | Pierce | |
| 9,573,432 B2 | 2/2017 | Wilson | |
| 9,890,440 B2 | 2/2018 | Wilson | |
| 10,065,470 B2 | 9/2018 | Son | |
| 10,239,372 B2 | 3/2019 | Bilancio | |
| 10,500,913 B1 | 12/2019 | Whitney | |
| 2003/0042698 A1 | 3/2003 | Simard | |
| 2006/0185926 A1 | 8/2006 | Simard | |
| 2006/0208445 A1 | 9/2006 | Gideon | |
| 2007/0040346 A1 | 2/2007 | Fenton | |
| 2007/0145656 A1 | 6/2007 | Svendsen | |
| 2007/0200418 A1 | 8/2007 | Takeda | |
| 2007/0273072 A1 | 11/2007 | Simard | |
| 2009/0194962 A1* | 8/2009 | Simard | B60G 11/04 280/124.111 |
| 2011/0095511 A1 | 4/2011 | Simard | |
| 2012/0112437 A1 | 5/2012 | Simard | |
| 2014/0117639 A1 | 5/2014 | Ramsey | |
| 2015/0091225 A1 | 4/2015 | Wilson | |
| 2017/0144498 A1 | 5/2017 | Son | |
| 2017/0204488 A1 | 7/2017 | Wilson | |
| 2017/0349019 A1 | 12/2017 | Bilancio | |

FOREIGN PATENT DOCUMENTS

| | | |
|---|---|---|
| CA | 2356022 A1 | 2/2003 |
| CA | 2535937 A1 | 8/2006 |
| CA | 2583991 A1 | 11/2007 |
| CA | 2645438 A1 | 8/2009 |
| CA | 2720356 A1 | 5/2012 |
| GB | 1244843 A | 9/1971 |
| WO | 2018013659 A1 | 1/2018 |

OTHER PUBLICATIONS

Dexter Axle, "Rocker Roller Kits", webpage, https://www.dexteraxle.com.au/rocker-roller-kits/, accessed Aug. 12, 2020, 7 pages.

Simard Suspensions Inc., "AMS40T-S16-Sterling-LT-7500-78-ASY," product assembly drawing, Sep. 18, 2006.

* cited by examiner

LOAD EQUALIZER ASSEMBLY FOR TANDEM STEER SUSPENSION

CROSS-REFERENCE TO RELATED APPLICATION

This application claims the benefit of U.S. Provisional Application No. 63/493,870, filed Apr. 3, 2023, which is hereby incorporated by reference herein in its entirety.

FIELD

The present disclosure relates to tandem steer suspension systems for vehicles.

BACKGROUND

U.S. Pat. No. 4,344,642 discloses a suspension system for a double-axle vehicle which allows load-sharing up and down movement of the axles to occur in a rectilinear manner so as to cope with road surface irregularities, such as potholes. The rectilinear manner of the movement ensures that the axles do not twist and, for example set up driveline vibration in a driven axle. The forward end of the leading spring and the trailing end of the other spring are each carried by a cranked rocker. The intermediate ends of the springs are interconnected by a further rocker. A torsion shaft links one axle to a rocker mounting point, and the free arms of the two cranked rockers are connected by a rod which causes the cranked rockers to move synchronously as the springs move up and down, thereby ensuring rectilinear movement of the springs.

U.S. Pat. No. 4,502,707 discloses a 4-spring, tandem axle suspension system comprising a pair of semi-elliptic compound leaf spring assemblies positioned on each side of the vehicle frame in fore-and-aft alignment. The remote ends of each pair of leaf springs are retained by engagement with front and rear brackets extending from the vehicle frame on each side, while the adjacent or proximate ends of the spring assemblies on each side are connected by means of a pair of shackles to opposing ends of an equalizer bar pivotally mounted on a bracket rigidly attached to the vehicle frame between the adjacent spring ends. Each inner or adjacent end of each spring assembly is pivotally attached to its shackles by means of a pivot bolt passing through a bushing and spring eye formed on the uppermost leaf of the spring assembly. A hook formed on the equalizer end of the second uppermost leaf of each multi-leaf spring assembly passes through an aperture provided in the adjacent shackle, and connects the shackle to the spring assembly in the event of failure of the spring eye or eye end of the main leaf, thereby preventing complete separation of each spring assembly from its shackle. This, in turn, prevents the freed end of the equalizer from damaging the adjacent torque rod in the case of the rear spring assembly, or prevents the broken section of the main spring leaf from damaging nearby chassis components such as air brake chambers in the case of the front spring assembly.

U.S. Pat. No. 5,234,067 discloses a tandem axle suspension for use in a vehicle such as a truck or semi-trailer, which is particularly efficient and stable and well adapted for use when the axles support steering wheels, that has, on each side, front and rear leaf-spring assemblies that are aligned with respect to each other and positioned forwardly and rearwardly of an equalizer beam. The front leaf-spring assembly has a front end pivotably connected by a pin to the vehicle frame and a rear end connected by a shackle to the front end of the equalizer beam. The rear leaf-spring assembly has a front end pivotably connected by a pin to the rear end of the equalizer beam and a rear end connected by a shackle to the frame of the vehicle.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one example of the present disclosure, a load equalizer assembly for a vehicle comprises a mounting bracket configured to be fixedly mounted to the vehicle. The mounting bracket comprises a downwardly extending first arm having a first hole extending laterally therethrough and a downwardly extending second arm having a second hole extending laterally therethrough. The second arm is longitudinally aligned with and laterally spaced from the first arm. The first and second holes are coaxially aligned with one another. A first equalizer bracket has a first aperture extending therethrough coaxial with the first and second holes. A second equalizer bracket has a second aperture extending therethrough coaxial with the first and second holes. The second equalizer bracket is longitudinally aligned with and laterally spaced from the first equalizer bracket. A pivot tube is provided within the first and second apertures in the respective first and second equalizer brackets, coaxial with the first and second holes. A fastener extends coaxially through the first and second holes in the respective first and second arms and through the pivot tube, thereby coupling the first and second equalizer brackets to the mounting bracket. The pivot tube is configured to facilitate pivoting of the first and second equalizer brackets with respect to the mounting bracket about a pivot axis defined by the fastener.

According to some examples, the first and second equalizer brackets are located laterally between the first and second arms of the mounting bracket.

According to some examples, the first equalizer bracket comprises a laterally outwardly facing side having a stepped surface with an inwardly stepped portion and an outwardly stepped portion. The first arm is received laterally adjacent to the inwardly stepped portion of the first equalizer bracket.

According to some examples, the first equalizer bracket comprises a lip at a junction of the inwardly stepped portion and the outwardly stepped portion. The first arm is received adjacent the lip.

According to some examples, the lip has a contour that roughly conforms to a contour of at least a portion of an outer edge of the first arm.

According to some examples, the lip and the outwardly stepped portion extend along at least part of a lower edge of the inwardly stepped portion of the first equalizer bracket.

According to some examples, the second equalizer bracket comprises a laterally outwardly facing side having a stepped surface with an inwardly stepped portion and an outwardly stepped portion. The second arm is received laterally adjacent to the inwardly stepped portion of the second equalizer bracket.

According to some examples, the inwardly stepped portion of the first equalizer bracket is configured to be located forward of the outwardly stepped portion of the first equalizer bracket when the load equalizer assembly is installed on the vehicle.

According to some examples, the load equalizer assembly further comprises a bushing provided within the pivot tube, coaxial with the first and second holes. An outer surface of the bushing is in intimate relationship with an inner surface of the pivot tube. An inner surface of the bushing is in intimate relationship with an outer surface of the fastener.

According to some examples, respective front ends of the first and second equalizer brackets are configured to be coupled to a front leaf spring of a suspension assembly of the vehicle. Respective rear ends of the first and second equalizer brackets are configured to be coupled to a rear leaf spring of the suspension assembly.

According to another example of the present disclosure, a load equalizer assembly for a vehicle comprises a mounting bracket configured to be fixedly mounted to the vehicle, the mounting bracket having a downwardly extending arm. An equalizer bracket is pivotally connected to the mounting bracket by way of the arm. The equalizer bracket comprises a laterally facing side having a stepped surface with an inwardly stepped portion and an outwardly stepped portion. The arm is received laterally adjacent to the inwardly stepped portion of the equalizer bracket.

According to some examples, the equalizer bracket comprises a lip at a junction of the inwardly stepped portion and the outwardly stepped portion. The arm is received adjacent the lip.

According to some examples, the lip has a contour that roughly conforms to a contour of at least a portion of an outer edge of the arm.

According to some examples, the lip and the outwardly stepped portion extend along at least part of a lower edge of the inwardly stepped portion of the equalizer bracket.

According to some examples, the equalizer bracket comprises an aperture extending laterally through the inwardly stepped portion of the equalizer bracket.

According to some examples, the arm comprises a hole extending laterally through the arm. A pivot tube is provided concentrically within the aperture in the equalizer bracket, the pivot tube being configured to rotate about a pivot axis within the aperture. A bushing is provided concentrically within the pivot tube. A fastener extends through the hole in the arm and through the bushing and thereby couples the equalizer bracket to the arm.

According to some examples, the laterally facing side of the equalizer bracket is a laterally outwardly facing side that faces outwardly with respect to a remainder of the load equalizer assembly. A laterally inwardly facing side of the arm is adjacent the laterally outwardly facing side of the equalizer bracket.

According to some examples, the inwardly stepped portion of the equalizer bracket is configured to be located forward of the outwardly stepped portion of the equalizer bracket when the load equalizer assembly is installed on the vehicle.

According to some examples, the arm is a first arm, and the equalizer bracket is a first equalizer bracket. The mounting bracket further comprises a downwardly extending second arm. The load equalizer assembly further comprises a second equalizer bracket pivotally connected to the mounting bracket by way of the second arm. The second equalizer bracket comprises a laterally facing side having a stepped surface with an inwardly stepped portion and an outwardly stepped portion. The second arm is received laterally adjacent to the inwardly stepped portion of the second equalizer bracket.

According to some examples, a front end of the equalizer bracket is configured to be coupled to a front leaf spring of a suspension assembly of the vehicle. A rear end of the equalizer bracket is configured to be coupled to a rear leaf spring of the suspension assembly.

BRIEF DESCRIPTION OF THE DRAWINGS

The present disclosure is described with reference to the following Figures. The same numbers are used throughout the Figures to reference like features and like components.

DETAILED DESCRIPTION

A suspension system for a tandem steer front axle vehicle allows load-sharing of up and down movement of the axles to occur in a rectilinear manner so as to cope with on-road and off-road surface irregularities. The rectilinear manner of the movement ensures that the axles more equally share the load for proper weight distribution in the tandem steer axles. The front end of the rear spring and the rear end of the front spring are each carried by a "load share" bracket assembly, which functions to equalize the loading of both axles. The load share bracket assembly may also be referred to herein as a "load equalizer assembly."

For example, a load equalizer assembly may function in the following manner. When, for example, the rear tandem steer axle is loaded more than the front tandem steer axle, the load equalizer assembly pivots to allow the front end of the rear spring to move upward. Pivoting of the load equalizer assembly applies force to the rear end of the front spring. The front spring applies an equal and opposite load on the load equalizer assembly, thereby equalizing (sharing) the load between the front and rear tandem steer axles. Similarly, when the front tandem steer axle is loaded more than the rear tandem steer axle, the load equalizer assembly pivots in an opposite direction to distribute part of the load to the rear tandem steer axle.

Figure 1:
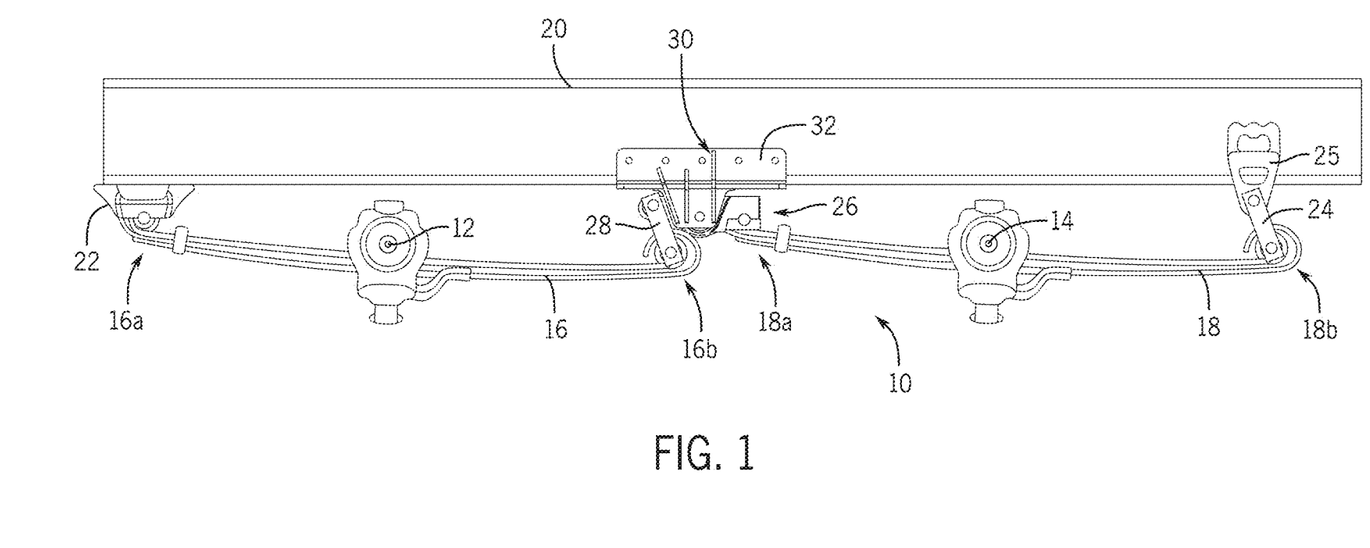
FIG. 1 shows a side view of a portion of a tandem steer suspension system according to the present disclosure.

FIG. 1 shows one example of a tandem steer axle suspension assembly 10 for use in a vehicle, the axles 12, 14 being configured to support steering wheels of the vehicle. The suspension assembly 10 may be used, for example, to support the front steering wheels of a semi-truck. A front axle 12 is supported by a front pair of leaf springs 16, one on each side of the vehicle's chassis 20. A rear axle 14 is supported by a rear pair of leaf springs 18, one on each side of the vehicle's chassis 20. Only one of each of the pairs of front and rear leaf springs 16, 18 is shown here, it being understood that the other leaf spring in each pair is a mirror image with respect to a longitudinal centerline of the chassis 20. Because the leaf springs 16, 18 and assemblies holding them are the same on each side, only the left side (driver's side) assemblies will be described further herein. On each side, a front end 16a of the front leaf spring 16 is coupled to the chassis 20 (here, by its eye being supported by a bracket 22), and a rear end 18b of the rear leaf spring 18 is coupled to the chassis 20 (here, by its eye being supported by a shackle 24, which is in turn suspended from a bracket 25 attached to the chassis 20). On each side, a rear end 16b of the front leaf spring 16 is supported at a front end of a load equalizer assembly 26 (here, by way of a shackle 28), and a front end 18a of the rear leaf spring 18 is supported at a rear end of the load equalizer assembly 26. The load equalizer assembly 26 is suspended from the chassis 20 by way of a mounting bracket 30 of the load equalizer assembly 26.

Figure 2:
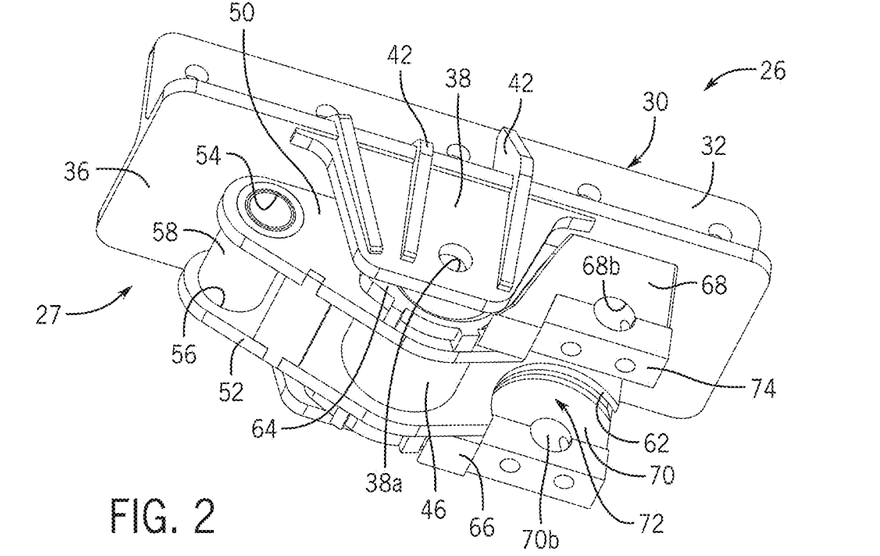
FIG. 2 is a bottom front perspective view of one example of a load equalizer assembly of the tandem steer suspension.
Figure 3:
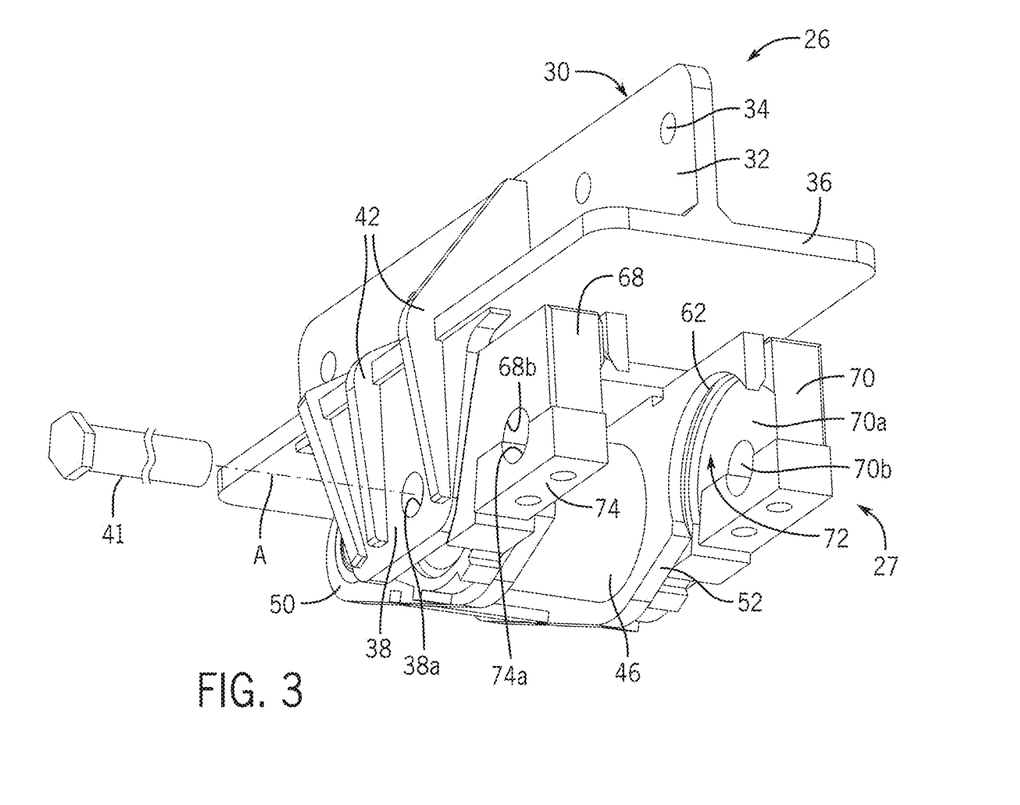
FIG. 3 is a bottom rear perspective view of the load equalizer assembly of FIG. 2.

FIGS. 2 and 3 show respective front and rear perspective views of the load equalizer assembly 26. The mounting bracket 30 is upside-down T-shaped in cross-section when viewed from the front or back. The vertical portion 32 of the mounting bracket 30 is configured to be attached to the chassis 20 (as shown in FIG. 1) by way of bolts inserted through bolt holes 34, although riveting or welding could additionally or alternatively be used. The horizontal portion 36 of the mounting bracket 30 may be integrally formed with the vertical portion 32 or may be welded with the vertical portion 32. A longitudinally aligned pair of first and second arms 38, 40 depend from a bottom surface of the horizontal portion 36 of the mounting bracket 30 and may be integrally formed therewith or welded thereto. Gussets 42 are welded to the vertical portion 32 and horizontal portion 36 of the mounting bracket 30 as well as to the outer face of the first arm 38 to provide strength. Similar gussets may be provided on the opposite side of the mounting bracket 30, along the outer face of the second arm 40.

The pair of first and second arms 38, 40 are provided with holes 38a, 40a that support a fastener 41 (FIG. 3), which in turn supports the remainder of the load equalizer assembly 26 in a pivotable manner with respect to the mounting bracket 30. Specifically, the fastener 41 extends coaxially through a barrel portion 46 of the load equalizer assembly 26, which barrel portion 46 is configured to fit between the inwardly facing surfaces of the arms 38, 40. The fastener 41 extends coaxially through a bearing or bushing 48 (FIG. 6), which is configured to rotate within the barrel portion 46. The fastener 41 extends coaxially through the holes 38a, 40a such that the barrel portion 46 is suspended from the bracket 30 by the fastener 41. In one example, the fastener 41 is a through bolt, at least one end of which is threaded to receive a nut. In another example, the fastener 41 may be a pin. A lower portion of the load equalizer assembly 26 pivots with respect to the bracket 30 about a pivot axis A defined along the fastener 41 by way of the bearing or bushing 48.

Figure 6:
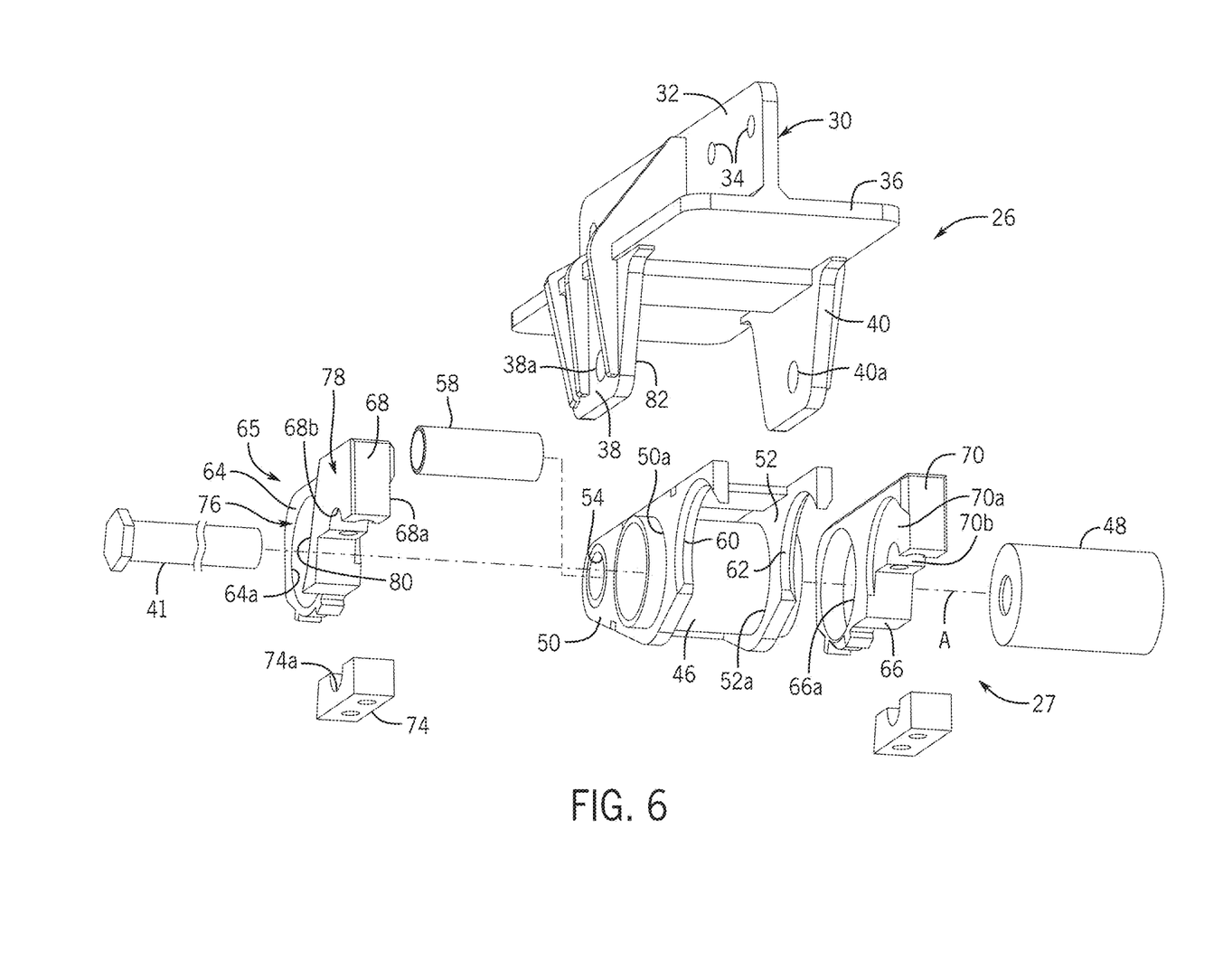
FIG. 6 is an exploded perspective view of the load equalizer assembly of FIG. 2.

Referring to FIGS. 2 and 6, a pair of inner brackets 50, 52 are supported by the barrel portion 46 by way of aligned circular apertures 50a, 52a respectively provided in the inner brackets 50, 52. Toward the front ends of the inner brackets 50, 52, additional aligned circular apertures 54, 56 are provided. These circular apertures 56, 56 support a roller 58, which in turn supports the shackle 28 (FIG. 1) that supports the rear end 16b of the front leaf spring 16. Toward the rear ends of the inner brackets 50, 52, semicircular receiving surfaces 60, 62 are provided, the purpose of which will be described herein below.

A pair of outer brackets 64, 66 are also supported by the barrel portion 46 by way of aligned circular apertures 64a, 66a respectively provided therein. The outer brackets 64, 66 are located outwardly of the inner brackets 50, 52 on the barrel portion 46. Each outer bracket 64, 66 has a rectangular rear portion 68, 70 with a semicircular depression 68a, 70a formed on its inwardly facing surface. Each outer bracket 64, 66 also has a downwardly facing semicircular depression 68b, 70b coaxial with the semicircular inwardly facing depressions 68a, 70a. Together, the semicircular receiving surfaces 60, 62 of the inner brackets 50, 52 and the semicircular depressions 68a, 70a on the outer brackets 64, 66 form receiving areas (e.g. 72, FIG. 3) for the front end 18a of the rear leaf spring 18. The roller is held in the receiving area 72 and a similar receiving area (not shown) formed by the inner and outer brackets 50, 64 by a pin (not shown) that is received within the downwardly facing semicircular depressions 68b, 70b. A block 74 having a mirror image semicircular depression 74a is fastened to the underside of the downwardly facing side of the rectangular rear portion 68 of the outer bracket 64 and supports the pin (which in turn supports the roller) vertically. A similar block (not shown) may be attached to the downwardly facing side of the rectangular rear portion 70 of the outer bracket 66 to support the pin and roller vertically as well.

The lower portion of the load equalizer assembly 26 (including inner brackets 50, 52, and outer brackets 64, 66, which together may form an equalizer bracket 27, and barrel portion 46) pivots about the pivot axis A with respect to upper portion of the load equalizer assembly 26 (i.e., the mounting bracket 30, including the arms 38, 40, horizontal portion 36, and vertical portion 32). Thus, the load equalizer assembly 26 allows the load to be spread between the front and rear leaf springs 16, 18. The roller 58 allows the shackle 28 to move as the front leaf spring 16 expands and contracts, and the roller (not shown) situated in the receiving area 72 and the mirror image receiving area formed by brackets 50, 64 allow the front end 18a of the rear leaf spring 18 to move as the rear leaf spring 18 expands and contracts.

Figure 4:
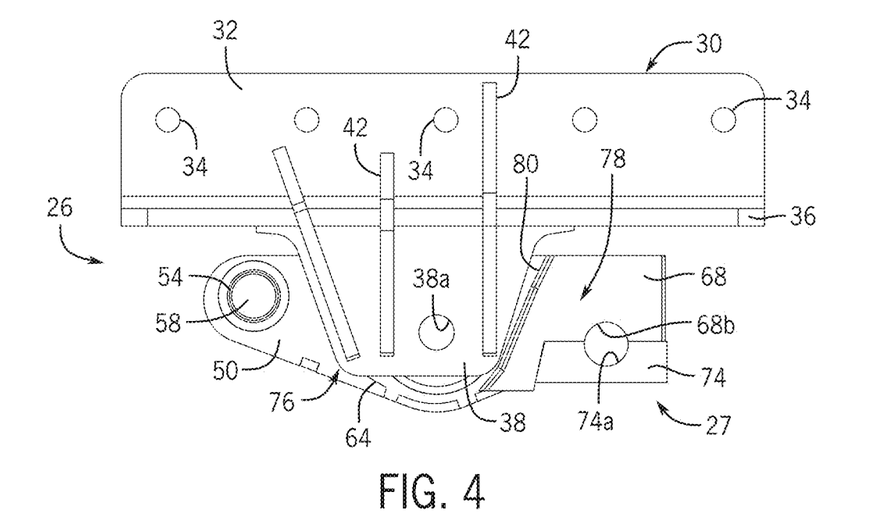
FIG. 4 is a side elevation view of the load equalizer assembly of FIG. 2.
Figure 5:
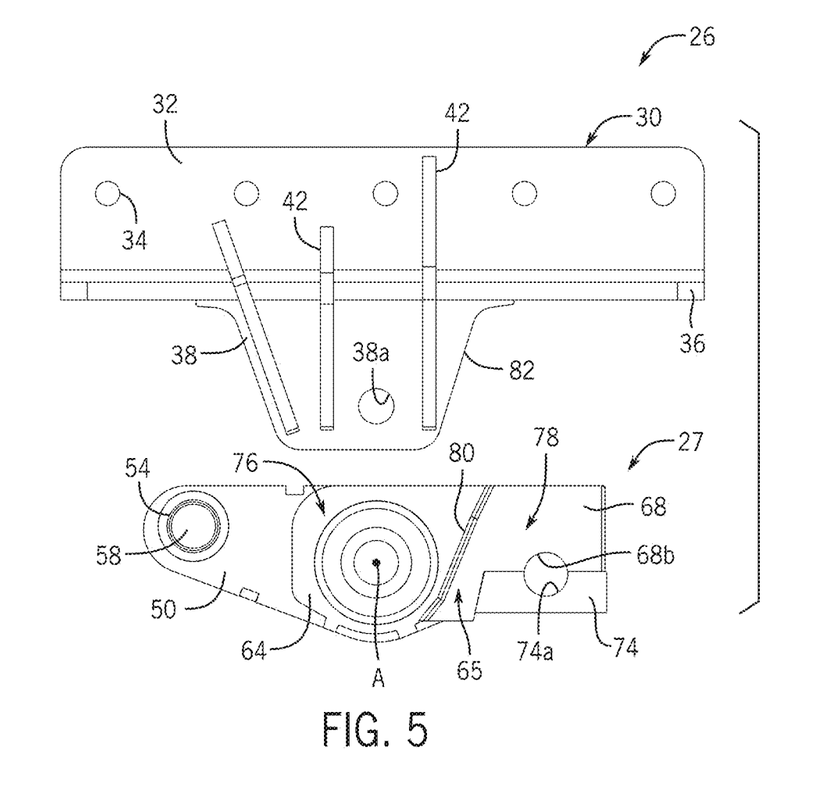
FIG. 5 is a partially exploded side elevation view like that of FIG. 4.

FIG. 5 shows a partially exploded side view of the load equalizer assembly 26 and will be referred to in conjunction with FIGS. 4 and 6 to illustrate another aspect of the equalizer bracket 27. Specifically, outer bracket 64 comprises a laterally outwardly facing side 65 (i.e., facing outwardly from a remainder of the load equalizer assembly 26) having a stepped surface with an inwardly stepped portion 76 and an outwardly stepped portion 78. The arm 38 is received laterally adjacent to the inwardly stepped portion 76 of the outer bracket 64. The outer bracket 64 comprises a lip 80 at a junction of the inwardly stepped portion 76 and the outwardly stepped portion 78. As shown in FIGS. 4 and 6, the arm 38 is received adjacent the lip 80. The placement of the arm 38 adjacent the inwardly stepped portion 76 of the outer bracket 64 minimizes the overall width of the equalizer bracket 27, providing a packaging benefit in that other components of the vehicle can be placed adjacent the laterally facing side of the load equalizer assembly 26 without extending too far outwardly from the vehicle. The lip 80 has a contour that roughly conforms to a contour of at least a portion of an outer edge 82 of the arm 38. This way, as the equalizer bracket 27 pivots about pivot axis A with respect to the mounting bracket 30, the outer edge 82 of the arm 38 does not interfere with the lip 80. At the same time, the outwardly stepped portion 78, which is thicker in the lateral direction than the inwardly stepped portion 76, can be made as large as possible, strengthening the equalizer bracket 27.

Although not shown here, the outer bracket 66 may be provided with a similar laterally outwardly facing side having a stepped surface with an inwardly stepped portion and an outwardly stepped portion and a lip at the junction between the inwardly and outwardly stepped portions. The arm 40 is received laterally adjacent to the inwardly stepped portion of the outer bracket 66. Again, this minimizes the overall width of the equalizer bracket 27.

FIGS. 7-10 illustrate another example of a load equalizer assembly 126 that can be used on a vehicle chassis 20 like that shown in FIG. 1, in place of the load equalizer assembly 26. The load equalizer assembly 126 extends longitudinally from a front end 111 to a rear end 113. The front end 111 is configured to be coupled to a rear end 16b of a front leaf spring 16 by way of a shackle 28, and the rear end 113 is configured to be coupled to a front end 18a of a rear leaf spring 18. A mounting bracket 130 is configured to be fixedly mounted to the vehicle chassis 20. The mounting bracket 130 is upside-down T-shaped in cross-section when viewed from the front or back. The vertical portion 132 of the mounting bracket 130 is configured to be attached to the chassis 20 by way of bolts inserted through bolt holes 134, although riveting or welding could additionally or alternatively be used. The horizontal portion 136 of the mounting bracket 130 may be integrally formed with the vertical portion 132 or may be welded with the vertical portion 132. As shown best in FIGS. 9 and 10, a longitudinally aligned pair of first and second arms 138, 140 depend downwardly from a bottom surface of the horizontal portion 136 of the mounting bracket 130 and may be integrally formed therewith or welded thereto. Gussets 142 are welded to the vertical portion 132 and horizontal portion 136 of the mounting bracket 130 as well as to the outer face of the first arm 138 to provide strength. Gussets 144 are also provided on the opposite side of the mounting bracket 30, along the outer face of the second arm 140. The downwardly extending first arm 138 has a first hole 138a (FIG. 9) extending laterally therethrough. The downwardly extending second arm 140 has a second hole 140a (FIG. 10) extending laterally therethrough. The second arm 140 is longitudinally aligned with and laterally spaced from the first arm 138 by a distance roughly corresponding to the lateral width of the horizontal portion 136 of the mounting bracket 130. The first and second holes 138a, 140a are coaxially aligned with one another for purposes discussed below.

The mounting bracket 130 supports first and second equalizer brackets 127, 129. The first equalizer bracket 127 has a first aperture 127a extending therethrough coaxial with the first and second holes 138a, 140a. The second equalizer bracket 129 has a second aperture 129a extending therethrough and coaxial with the first and second holes 138a, 140a. The second equalizer bracket 129 is longitudinally aligned with and laterally spaced from the first equalizer bracket 127. Spacer blocks 196 may be provided to maintain the desired spacing between the first and second equalizer brackets 127, 129. The spacer blocks 196 may be fastened to the first and second equalizer brackets 127, 129 by way of fasteners provided through the holes shown herein, or they may be welded, riveted, or adhered thereto. In the present example, the first and second equalizer brackets 127, 129 are located laterally between the first and second arms 138, 140 of the mounting bracket 130, but in other examples, the first and second equalizer brackets 127, 129 could be located laterally outwardly of the respective first and second arms 138, 140.

A pivot tube 146 is provided within the first and second apertures 127a, 129a in the respective first and second equalizer brackets 127, 129, coaxial with the first and second holes 138a, 140a. A spacer sleeve 147 may be provided around the pivot tube 146, which spacer sleeve 147 extends laterally between an inwardly facing surface of the first equalizer bracket 127 and an inwardly facing surface of the second equalizer bracket 129. A fastener 141 extends coaxially through the first and second holes 138a, 140a in the respective first and second arms 138, 140 and through the pivot tube 146, thereby coupling the first and second equalizer brackets 127, 129 to the mounting bracket 130. Here, the fastener 141 is a through bolt having a threaded end that receives a washer 197 and nut 198, which are tightened against the outer face of the second arm 140. In another example, the fastener could be a pin. The pivot tube 146 is configured to facilitate pivoting of the first and second equalizer brackets 127, 129 with respect to the mounting bracket 130 about a pivot axis A (FIGS. 7, 8) defined by the fastener 141.

A bushing 148 is provided within the pivot tube 146, coaxial with the first and second holes 138a, 140a. The bushing 148 includes an inner sleeve 149 and two outer elastomeric elements 151 provided about the sleeve 149. The sleeve 149 is made of a relatively rigid material, such as metal (for example, steel or bronze). The elastomeric elements 151 are made of a relatively flexible material, such as a polymer (for example, high durometer rubber or polyurethane). An outer surface of the bushing 148 (that is, the outer surface 155 of each elastomeric element 151) is in intimate relationship with an inner surface 145 of the pivot tube 146. An inner surface of the bushing 148 (that is, the inner surface 153 of the sleeve 149) is in intimate relationship with an outer surface of the fastener 141, which may not be threaded along the length thereof that passes through the bushing 148. For example, the fastener 141 is press fit within the sleeve 149, which is press fit within the elastomeric elements 151, which are press fit within the pivot tube 146. Such an arrangement allows the elastomeric elements 151 to take up the torsional forces that act on the equalizer brackets 127, 129, reducing or eliminating the torsional force that is transferred to the mounting bracket 130.

Toward the front end 111 of the load equalizer assembly 126, aligned circular apertures 154, 156 are provided in the respective first and second equalizer brackets 127, 129. These circular apertures 154, 156 support a roller 158, which in turn is configured to support the shackle 28 (FIG. 1) that supports the rear end 16b of the front leaf spring 16. Toward the rear end 113 of the load equalizer assembly 126, depressed receiving areas 168a, 170a and downwardly facing semicircular depressions 168b, 170b are provided in the respective first and second equalizer brackets 127, 129. The receiving areas 168a, 170a are configured to receive the front end 18a of the rear leaf spring 18. The roller is held in the receiving areas 168a, 170a by a pin (not shown) that is received within the downwardly facing semicircular depressions 168b, 170b. Blocks (similar to block 74 in FIGS. 2-6) are fastened to the undersides of these areas to support the pin (which in turn supports the roller) vertically.

The equalizer brackets 127, 129 can pivot about the pivot tube 146 and thus about the pivot axis A with respect to the mounting bracket 130, with relative motion between the outside surface of the pivot tube 146 and the inner surfaces of the apertures 127a, 129a. Thus, the load equalizer assembly 126 allows the load to be spread between the front and rear leaf springs 16, 18. The roller 158 allows the shackle 28 to move as the front leaf spring 16 expands and contracts, and the roller (not shown) situated in the receiving areas 168a, 170a allow the front end 18a of the rear leaf spring 18 to move as the rear leaf spring 18 expands and contracts.

Figure 7:
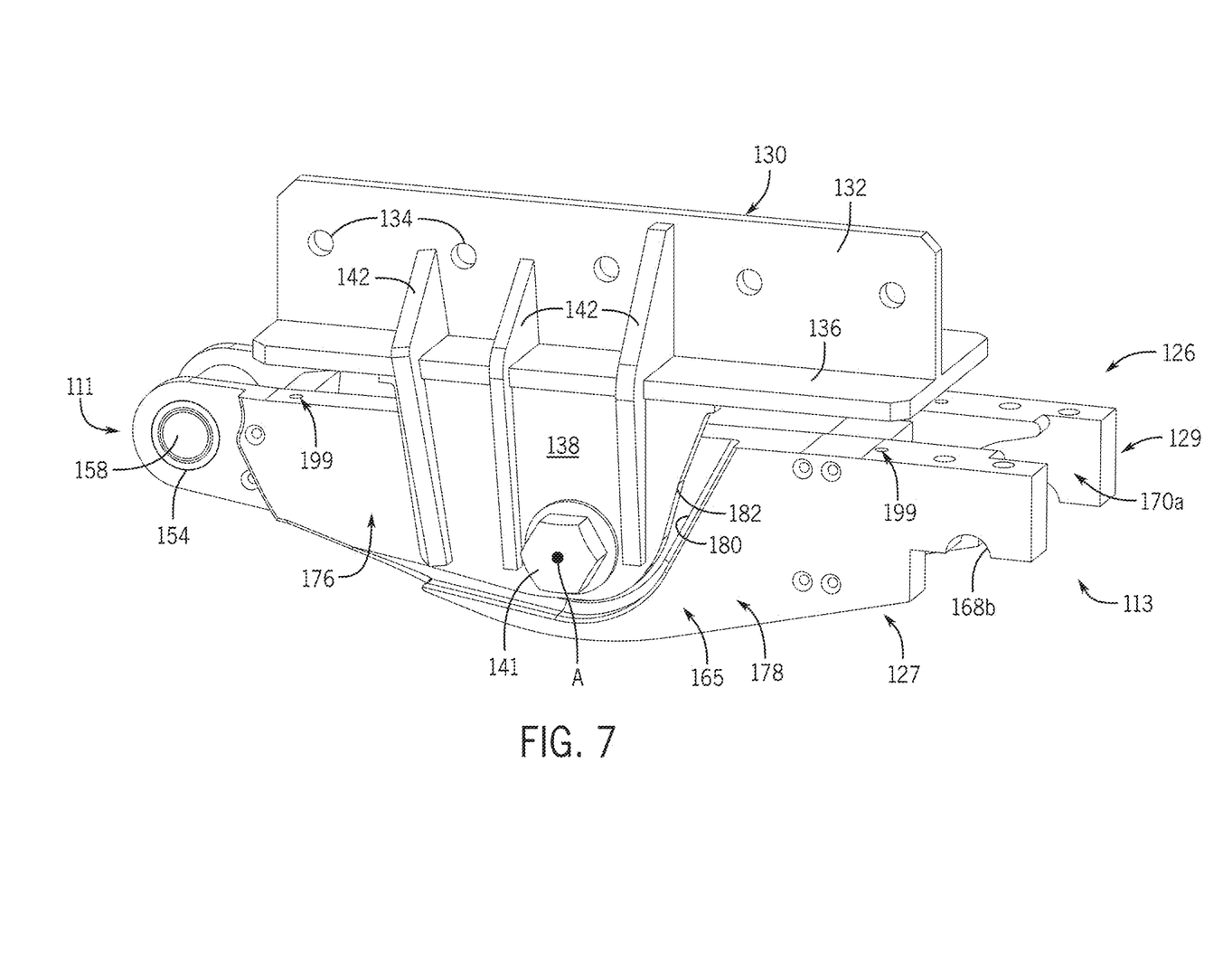
FIG. 7 is a side perspective view of another example of a load equalizer assembly for a tandem steer suspension system.
Figure 8:
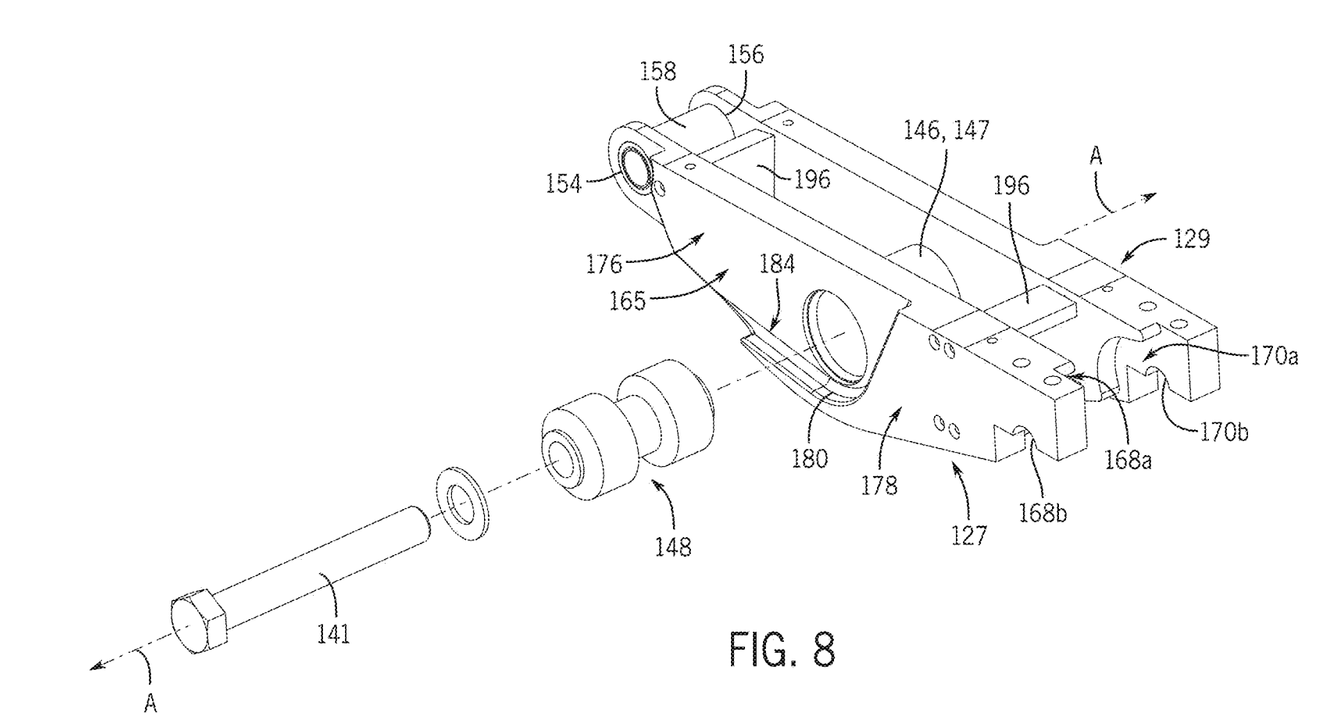
FIG. 8 is a partially exploded rear perspective view of the load equalizer assembly of FIG. 7.
Figure 9:
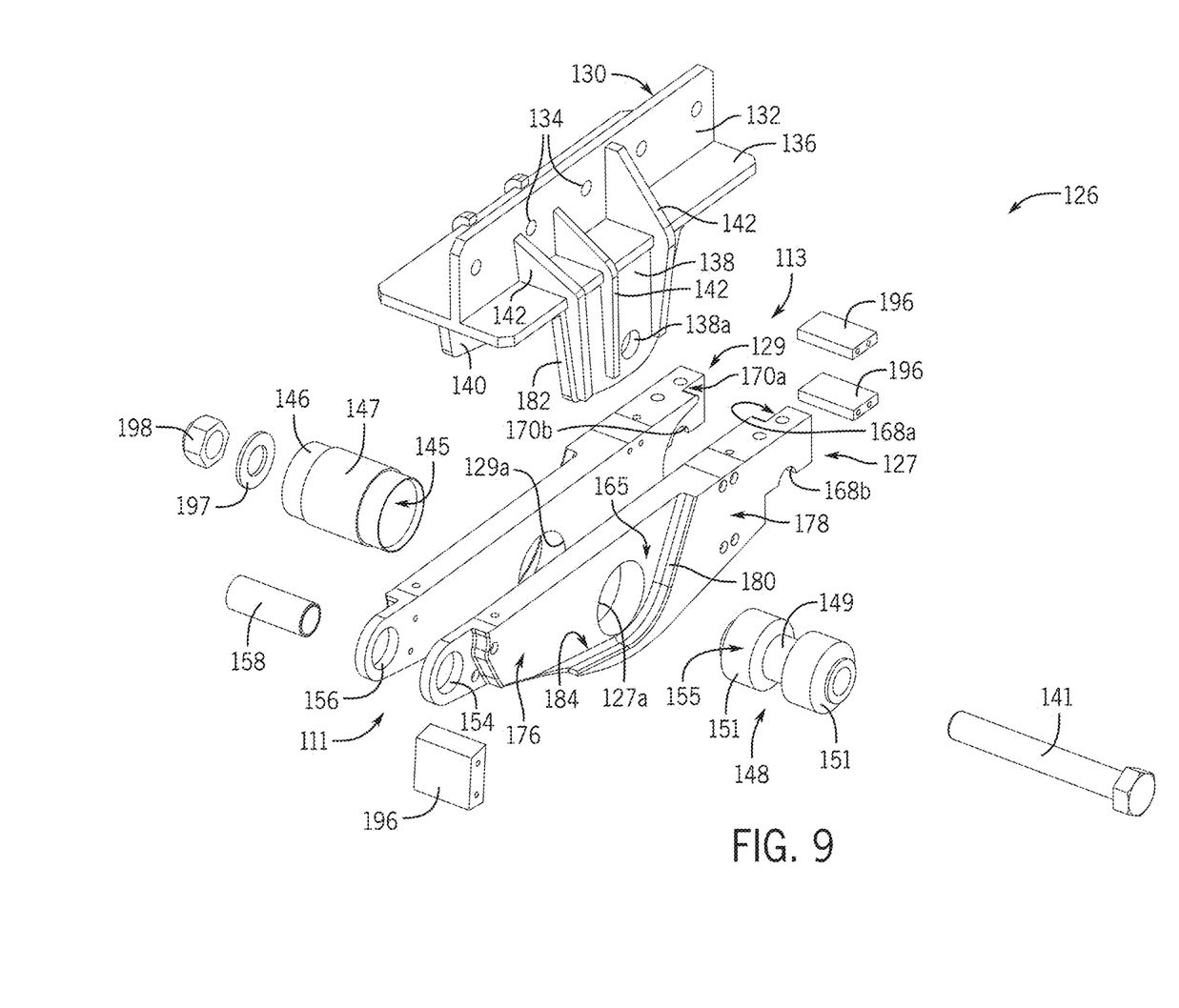
FIG. 9 is an exploded front perspective view of the load equalizer assembly of FIG. 7.

Referring to FIGS. 7-9, the first equalizer bracket 127 comprises a laterally outwardly facing side 165 having a stepped surface with an inwardly stepped portion 176 and an outwardly stepped portion 178. The inwardly stepped portion 176 of the first equalizer bracket 127 is configured to be located forward of the outwardly stepped portion 178 of the first equalizer bracket 127 when the load equalizer assembly 126 is installed on the vehicle. The first arm 138 is received laterally adjacent to the inwardly stepped portion 176 of the first equalizer bracket 127. The first equalizer bracket 127 comprises a lip 180 at a junction of the inwardly stepped portion 176 and the outwardly stepped portion 178. As shown in FIG. 7, the first arm 138 is received adjacent the lip 180. The placement of the arm 138 adjacent the inwardly stepped portion 176 of the first equalizer bracket 127 minimizes the overall width of the first equalizer bracket 127, providing a packaging benefit in that other components of the vehicle can be placed adjacent the laterally facing side of the load equalizer assembly 126 without extending too far outwardly from the vehicle. The lip 180 has a contour that roughly conforms to a contour of at least a portion of an outer edge 182 of the first arm 138. This way, as the equalizer bracket 127 pivots about pivot axis A with respect to the mounting bracket 130, the outer edge 182 of the first arm 138 does not interfere with the lip 180. At the same time, the outwardly stepped portion 178, which is thicker in the lateral direction than the inwardly stepped portion 176, can be made as large as possible, strengthening the equalizer bracket 127. Moreover, the lip 180 and the outwardly stepped portion 178 extend along at least part of a lower edge 184 of the inwardly stepped portion 176 of the first equalizer bracket 127. Because the outwardly stepped portion 178 is thicker in the lateral direction than the inwardly stepped portion 176, extension of the outwardly stepped portion 178 along the lower edge 184 of the inwardly stepped portion 176 allows the load equalizer assembly 126 to handle stresses associated with unequal load being applied to the front or rear axle 12, 14.

Although not shown herein, bump stops may be provided on upwardly facing surfaces of the equalizer bracket 127 at locations 199 (FIG. 7) to further prevent the outer edge 182 of the first arm 138 from interfering with the lip 180 and to prevent damage to the equalizer bracket 127 that might otherwise occur were the equalizer bracket 127 to contact the chassis.

Figure 10:
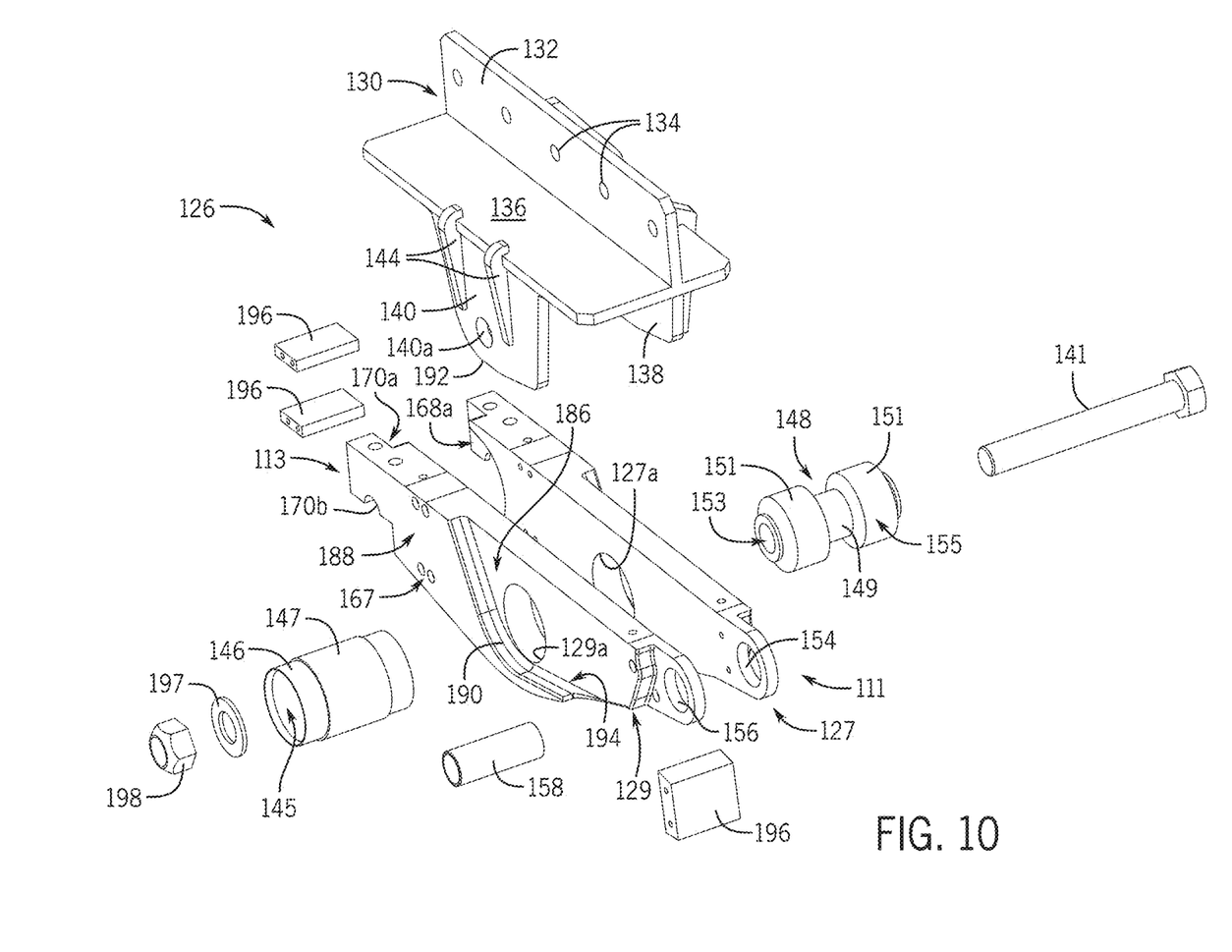
FIG. 10 is an exploded front perspective view of an opposite side of the load equalizer assembly of FIG. 7.

Referring to FIG. 10, the second equalizer bracket 129 comprises a laterally outwardly facing side 167 having a stepped surface with an inwardly stepped portion 186 and an outwardly stepped portion 188. The second arm 140 is received laterally adjacent to the inwardly stepped portion 186 of the second equalizer bracket 129. The second equalizer bracket 129 comprises a lip 190 at a junction of the inwardly stepped portion 186 and the outwardly stepped portion 188. The second arm 140 is received adjacent the lip 190. The lip 190 has a contour that roughly conforms to a contour of at least a portion of an outer edge 192 of the second arm 140. The lip 190 and the outwardly stepped portion 188 extend along at least part of a lower edge 194 of the inwardly stepped portion 186 of the second equalizer bracket 129, adding strength to this high-stress area.

Thus, referring to all the figures, the present disclosure is of a load equalizer assembly 26, 126 for a vehicle. The load equalizer assembly 26, 126 comprises a mounting bracket 30, 130 configured to be fixedly mounted to the vehicle (by way of the chassis 20). The mounting bracket 30, 130 has a downwardly extending arm 38, 40, 138, 140. An equalizer bracket 27, 127, 129 is pivotally connected to the mounting bracket 30, 130 by way of the arm 38, 40, 138, 140. A front end of the equalizer bracket 27, 127, 129 is configured to be coupled to a front leaf spring 16 of a suspension assembly of the vehicle, and a rear end of the equalizer bracket 27, 127, 129 is configured to be coupled to a rear leaf spring 18 of the suspension assembly. The equalizer bracket 27, 127, 129 comprises a laterally facing side 65, 165, 167 having a stepped surface with an inwardly stepped portion 76, 176, 186 and an outwardly stepped portion 78, 178, 188. The inwardly stepped portion 76, 176, 186 of the equalizer bracket 27, 127, 129 is configured to be located forward of the outwardly stepped portion 78, 178, 188 of the equalizer bracket 27, 127, 129 when the load equalizer assembly 26, 126 is installed on the vehicle. The arm 38, 40, 138, 140 is received laterally adjacent to the inwardly stepped portion 76, 176, 186 of the equalizer bracket 27, 127, 129. The laterally facing side 65, 165, 167 of the equalizer bracket 27, 127, 129 is a laterally outwardly facing side that faces outwardly with respect to a remainder of the load equalizer assembly 26, 126. A laterally inwardly facing side of the arm 38, 40, 138, 140 is adjacent the laterally outwardly facing side 65, 165, 167 of the equalizer bracket 27, 127, 129.

The equalizer bracket 27, 127, 129 comprises a lip 80, 180, 190 at a junction of the inwardly stepped portion 76, 176, 186 and the outwardly stepped portion 78, 178, 188. The arm 38, 40, 138, 140 is received adjacent the lip 80, 180, 190. The lip 80, 180, 190 has a contour that roughly conforms to a contour of at least a portion of an outer edge 82, 182, 192 of the arm 38, 40, 138, 140. In the example of FIGS. 7-10, the lip 180, 190 and the outwardly stepped portion 178, 188 extend along at least part of a lower edge 184, 194 of the inwardly stepped portion 176, 186 of the equalizer bracket 127, 129.

In the example of FIGS. 7-10, each equalizer bracket 127, 129 comprises an aperture 127a, 129a extending laterally through the inwardly stepped portion 176, 186 of the equalizer bracket 127, 129. The arms 138, 140 comprise holes 138a, 140a extending laterally through the arms 138, 140. A pivot tube 146 is provided concentrically within the apertures 127a, 129a in the equalizer brackets 127, 129. A bushing 148 is provided concentrically within the pivot tube 146. A fastener 141 extends through the holes 138a, 140a in the arms 138, 140 and through the bushing 148 and thereby couples the equalizer brackets 127, 129 to the arms 138, 140.

In the present description, certain terms have been used for brevity, clarity, and understanding. No unnecessary limitations are to be implied therefrom beyond the requirement of the prior art because such terms are used for descriptive purposes only and are intended to be broadly construed. The different assemblies described herein may be used alone or in combination with other systems. Various equivalents, alternatives, and modifications are possible within the scope of the appended claims.

What is claimed is:

1. A load equalizer assembly for a vehicle, the load equalizer assembly comprising:
   a mounting bracket configured to be fixedly mounted to the vehicle, the mounting bracket comprising:
     a downwardly extending first arm having a first hole extending laterally therethrough; and
     a downwardly extending second arm having a second hole extending laterally therethrough;
     wherein the second arm is longitudinally aligned with and laterally spaced from the first arm; and
     wherein the first and second holes are coaxially aligned with one another;

a first equalizer bracket having a first aperture extending therethrough coaxial with the first and second holes, wherein the first equalizer bracket is located laterally between the first and second arms of the mounting bracket; and a second equalizer bracket having a second aperture extending therethrough coaxial with the first and second holes, the second equalizer bracket being located laterally between the first and second arms of the mounting bracket and longitudinally aligned with and laterally spaced from the first equalizer bracket;

a pivot tube provided within the first and second apertures in the respective first and second equalizer brackets, coaxial with the first and second holes; and a fastener extending coaxially through the first and second holes in the respective first and second arms and through the pivot tube, thereby coupling the first and second equalizer brackets to the mounting bracket;

wherein the pivot tube is configured to facilitate pivoting of the first and second equalizer brackets with respect to the mounting bracket about a pivot axis defined by the fastener;

wherein the first equalizer bracket comprises a laterally outwardly facing side having a stepped surface with an inwardly stepped portion and an outwardly stepped portion; and wherein the first arm is received laterally adjacent to the inwardly stepped portion of the first equalizer bracket.

2. The load equalizer assembly of claim 1, wherein the first equalizer bracket comprises a lip at a junction of the inwardly stepped portion and the outwardly stepped portion; and wherein the first arm is received adjacent the lip.

3. The load equalizer assembly of claim 2, wherein the lip has a contour that roughly conforms to a contour of at least a portion of an outer edge of the first arm.

4. The load equalizer assembly of claim 2, wherein the lip and the outwardly stepped portion extend along at least part of a lower edge of the inwardly stepped portion of the first equalizer bracket.

5. The load equalizer assembly of claim 1, wherein the second equalizer bracket comprises a laterally outwardly facing side having a stepped surface with an inwardly stepped portion and an outwardly stepped portion; and wherein the second arm is received laterally adjacent to the inwardly stepped portion of the second equalizer bracket.

6. The load equalizer assembly of claim 1, wherein the inwardly stepped portion of the first equalizer bracket is configured to be located forward of the outwardly stepped portion of the first equalizer bracket when the load equalizer assembly is installed on the vehicle.

7. The load equalizer assembly of claim 1, further comprising a bushing provided within the pivot tube, coaxial with the first and second holes;

wherein an outer surface of the bushing is in intimate relationship with an inner surface of the pivot tube; and wherein an inner surface of the bushing is in intimate relationship with an outer surface of the fastener.

8. The load equalizer assembly of claim 1, wherein respective front ends of the first and second equalizer brackets are configured to be coupled to a front leaf spring of a suspension assembly of the vehicle; and wherein respective rear ends of the first and second equalizer brackets are configured to be coupled to a rear leaf spring of the suspension assembly.

9. A load equalizer assembly for a vehicle, the load equalizer assembly comprising:

a mounting bracket configured to be fixedly mounted to the vehicle, the mounting bracket having a downwardly extending arm; and an equalizer bracket pivotally connected to the mounting bracket by way of the arm;

wherein the equalizer bracket comprises a laterally facing side having a stepped surface with an inwardly stepped portion and an outwardly stepped portion; and wherein the arm is received laterally adjacent to the inwardly stepped portion of the equalizer bracket.

10. The load equalizer assembly of claim 9, wherein the equalizer bracket comprises a lip at a junction of the inwardly stepped portion and the outwardly stepped portion; and wherein the arm is received adjacent the lip.

11. The load equalizer assembly of claim 10, wherein the lip has a contour that roughly conforms to a contour of at least a portion of an outer edge of the arm.

12. The load equalizer assembly of claim 10, wherein the lip and the outwardly stepped portion extend along at least part of a lower edge of the inwardly stepped portion of the equalizer bracket.

13. The load equalizer assembly of claim 9, wherein the equalizer bracket comprises an aperture extending laterally through the inwardly stepped portion of the equalizer bracket.

14. The load equalizer assembly of claim 13, wherein the arm comprises a hole extending laterally through the arm, and the load equalizer assembly further comprises:

a pivot tube provided concentrically within the aperture in the equalizer bracket;

a bushing provided concentrically within the pivot tube; and a fastener extending through the hole in the arm and through the bushing and thereby coupling the equalizer bracket to the arm.

15. The load equalizer assembly of claim 9, wherein the laterally facing side of the equalizer bracket is a laterally outwardly facing side that faces outwardly with respect to a remainder of the load equalizer assembly; and wherein a laterally inwardly facing side of the arm is adjacent the laterally outwardly facing side of the equalizer bracket.

16. The load equalizer assembly of claim 9, wherein the inwardly stepped portion of the equalizer bracket is configured to be located forward of the outwardly stepped portion of the equalizer bracket when the load equalizer assembly is installed on the vehicle.

17. The load equalizer assembly of claim 9, wherein the arm is a first arm and the equalizer bracket is a first equalizer bracket;

wherein the mounting bracket further comprises a downwardly extending second arm;

wherein the load equalizer assembly further comprises a second equalizer bracket pivotally connected to the mounting bracket by way of the second arm;

wherein the second equalizer bracket comprises a laterally facing side having a stepped surface with an inwardly stepped portion and an outwardly stepped portion; and wherein the second arm is received laterally adjacent to the inwardly stepped portion of the second equalizer bracket.

18. The load equalizer assembly of claim 9, wherein a front end of the equalizer bracket is configured to be coupled to a front leaf spring of a suspension assembly of the vehicle; and wherein a rear end of the equalizer bracket is configured to be coupled to a rear leaf spring of the suspension assembly.

* * * * *